Sept. 22, 1970 R. G. GAPPA 3,529,729
STAND FOR BICYCLES AND THE LIKE
Filed July 19, 1968
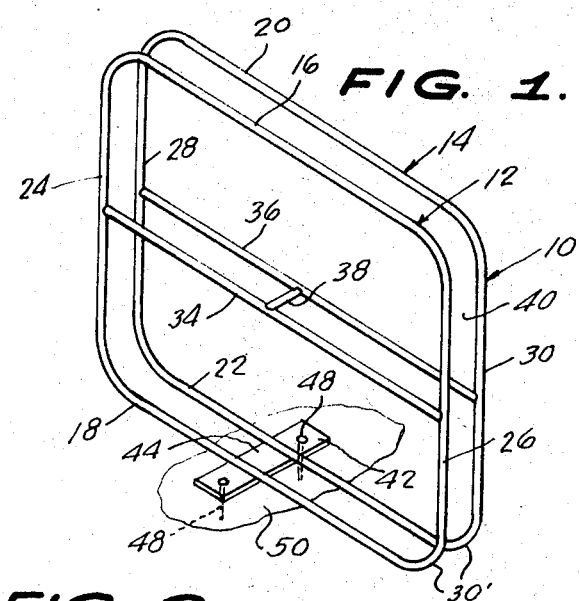
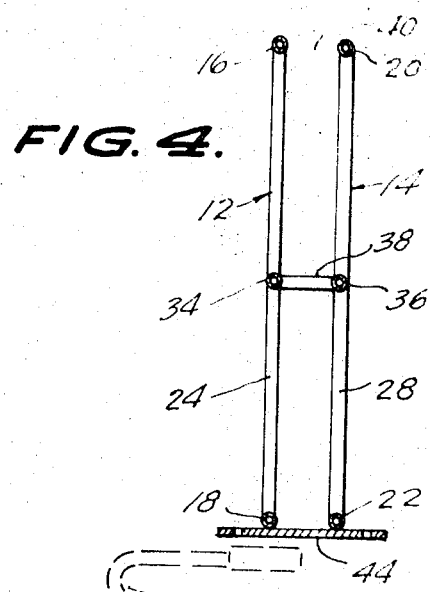
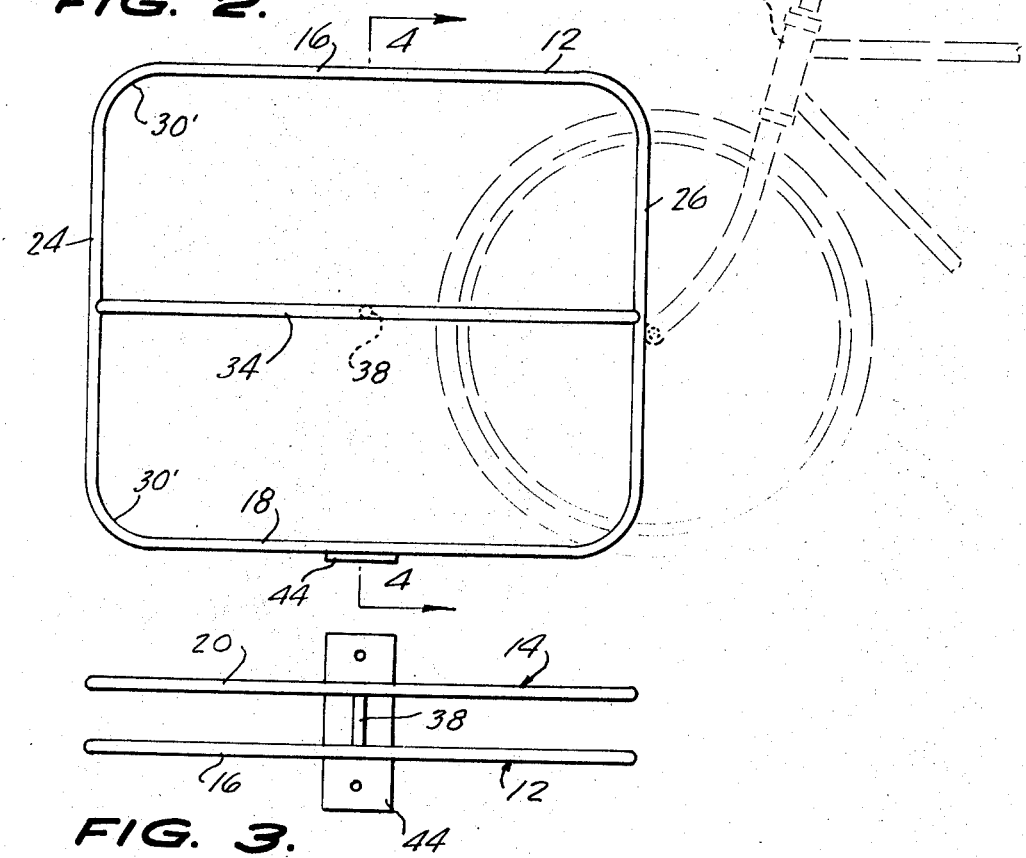
INVENTOR.
ROBERT G. GAPPA,
BY
Berman, Davidson & Berman
ATTORNEYS.

United States Patent Office 3,529,729
Patented Sept. 22, 1970

3,529,729
STAND FOR BICYCLES AND THE LIKE
Robert G. Gappa, 2628 St. Anthony,
Colorado Springs, Colo. 80904
Filed July 19, 1968, Ser. No. 746,068
Int. Cl. B62h 3/04
U.S. Cl. 211—20         2 Claims

ABSTRACT OF THE DISCLOSURE

Apparatus for maintaining bicycles in an upright position including tubular members forming a substantially rectangular frame and spaced apart and having openings in the opposite sides thereof for receiving the wheels of bicycles between the spaced apart tubular members.

---

The present invention relates to a rack or a stand for maintaining a bicycle or the like in an upright position. It is an object of the present invention to provide means for maintaining vehicles such as bicycles, motorcycles, scooters, and other similar vehicles which are not stable or capable of sustaining themselves in an upright position, without requiring bracing or other support means.

It is yet another object of the present invention to provide a bicycle stand which is adaptable for accommodating bicycles with wheels of different widths or tire sizes, such as bicycles having narrow tires, and also bicycles having balloon tires.

Yet another object of the present invention is to provide a bicycle rack or stand made of tubular members that forms a substantially rectangular configuration with the tubular member spaced apart from one another and providing openings in opposite sides thereof for receiving the wheels of at least two bicycles or vehicles therein.

Another object of the present invention is to provide a tubular stand for maintaining bicycles and other vehicles in an upright position in which at least two bicycles can be maintained in an upright position in the stand of the present invention, and which bicycles are further maintained in the same plane so that the bicycle stand of the present invention conserves space, as for example, by storing the bicycles along a wall in front of a store on a sidewalk, so that the sidewalk will not be narrowly restricted for pedestrians.

Yet another object of the present invention is to provide a bicycle stand of simple and economical construction so that it can be readily manufactured in a most economical manner.

A still further object of the present invention is to provide a bicycle rack for holding at least two bicycles and the like in the same plane, which rack or bicycle stand is portable and can be constructed so as to require no other support than the base member of the bicycle rack itself.

Various other objects and advantages of the present invention will be more readily apparent from the following detailed description when considered in connection with the accompanying drawings forming a part thereof, and in which:

FIG. 1 is a perspective view of the bicycle stand embodied in the present invention;

FIG. 2 is a side elevational view of the bicycle rack shown in FIG. 1, illustrating the wheel of a bicycle disposed in the stand;

FIG. 3 is a plan view of the bicycle rack shown in FIG. 2; and

FIG. 4 is a section taken along the lines 4—4 of FIG. 2.

Referring to the drawings, the reference numeral 10 generally designates the bicycle stand or rack of the present invention for maintaining in an upright position vehicles such as bicycles, motorcycles, scooters and other vehicles which are not stable or capable of being positioned in an upright manner without bracing or other support. For convenience, such vehicles will be generally referred to as bicycles.

The bicycle rack or stand 10 comprises two tubular members 12 and 14. The tubular members are preferably hollow, although they may be made of solid bars, if desired. The tubular members 12 and 14 have substantially horizontal top and bottom pieces 16 and 18 for tubular member 12 and 20 and 22 for tubular member 14. The tubular member 12 is also provided with substantially vertically extending end pieces 24 and 26 while the tubular member 14 is provided with identical vertically extending end pieces 28 and 30. The tubular member 12 is preferably made of one piece, so that the top and bottom pieces 16 and 18, and the end pieces 24 and 26 form a continuous tubular member of rectangular configuration, as best seen in FIG. 2, with the end portions 30' between the pieces being rounded or arcuate.

The tubular member 14 also has its top and bottom pieces 20 and 22 and tis end pieces 28 and 30 forming a continuous member and being identical in dimension to the tubular member 12.

The tubular member 12 is provided with a substantially horizontally extending tubular member 34 extending between the end pieces 24 and 26 midway between the top piece 16 and the bottom piece 18. The tubular member 14 is also provided with a substantially horizontally extending middle tubular piece 36 extending between the end pieces 28 and 30, and disposed halfway up from the bottom piece 22, and halfway down from the top piece 20, so that the pieces 34 and 36 are in lateral alignment with each other.

A crossbar or tubular piece 38 extends between the horizontal pieces 34 and 36 as best seen in FIG. 1, and this cross piece 38 is disposed approximately the center point of the pieces 34 and 36, or midway between the ends of these pieces 34 and 36. The cross piece 38 maintains the tubular members 12 and 14 in spaced relationship with each other, and spaces these tubular members a sufficient distance from each, so that the space 40 between the tubular members is of sufficient width to accommodate bicycles having wheels of different widths or tire sizes, so that the stand can accommodate bicycles or vehicles of various wheel sizes.

Referring to FIG. 1, it will be seen that the bottom pieces 18 and 22 have their central portions secured to a substantially rectangular flat base plate or member 42. The member 42 is preferably of metal and the pieces may be secured thereto by any suitable means, such as bolts, or the pieces may be welded to the plate 42. Thus, the tubular members 12 and 14 are spaced apart by the cross piece 38, as well as the central portion 44 of the plate 42, so that the entire structure is formed of a single piece. The plate 42 may be of sufficient weight so as to form an anchor or base for the rack when it has a bicycle, 46 disposed in one side, as well as a bicycle, not shown, disposed in the opposite side in the same plane with the bicycle 46.

Preferably the flat plate 42 is provided with two apertures therein for receiving two bolts 48 therein so that the plate 42 may be anchored to a sidewalk if desired. As seen in FIG. 1, the bolts 48 are imbedded in concrete 50, which forms a part of the sidewalk upon which the stand is anchored. Thus, from the foregoing description, it is apparent that the present invention provides a simple and economical tubular structure consisting of two spaced apart tubular members forming a continuous loop and open at the opposite sides so as to receive the front wheels of two bicycles in order to maintain the bicycles in an upright position.

It is further observed that the present invention can mount two bicycles in the same plane, which is very important in conserving space as, for example, by storing two bicycles along a wall on a sidewalk or in front of a store, so that the sidewalk is not unduly restricted or narrowed for pedestrians passing by.

Inasmuch as various changes may be made in the relative arrangement and location and form of the present invention without departing from the scope of the invention, it is not meant to limit the invention except by the scope of he following claims.

What is claimed is:

1. A stand for holding bicycles and similar vehicles in upright positions, comprising a base in the form of a small flat plate, a pair of substantially identical loop members disposed in vertical planes and having lower sides rigidly secured at their centers to said base plate, said loop members being solely supported by said base plate and being adapted to receive the wheels of two bicycles in the space between said loop members, each of said loop members being formed of a tubular element lying entirely within a single plane but bent to define the perimeter of a substantially rectangular flat body having an area larger than the area of a bicycle wheel, said base plate lying transversely under the lower sides of said loop members and extending beyond them to form exterior end portions each having an aperture for reception of ground securement means, a longitudinal bracing piece lying completely in the plane of each of said loop members and rigidly connecting the opposite sides thereof, and a cross-brace extending between said loop members and having its ends rigidly and permanently connected to said longitudinal bracing pieces.

2. The stand of claim 1, wherein said longitudinal bracing pieces are disposed horizontally substantially midway between the upper and lower sides of their respective loop members.

References Cited

UNITED STATES PATENTS

| D. 32,181 | 1/1900 | Pease. | |
|---|---|---|---|
| D. 201,143 | 5/1965 | Vigilante. | |
| 529,939 | 11/1894 | Nodever | 211—24 XR |
| 608,464 | 8/1898 | Lewis | 211—5 |
| 1,202,444 | 10/1916 | Soleau | 211—24 XR |

FOREIGN PATENTS

| 773,034 | 4/1957 | Great Britain. |
|---|---|---|
| 24,833 | 8/1919 | Denmark. |
| 27,928 | 7/1921 | Denmark. |
| 243,950 | 2/1947 | Switzerland. |

ROY D. FRAZIER, Primary Examiner

A. FRANKEL, Assistant Examiner

U.S. Cl. X.R.

211—22